United States Patent
Tomiyama (12)

(10) Patent No.: US 7,023,679 B2
(45) Date of Patent: Apr. 4, 2006

(54) OVERVOLTAGE FLY-BACK RESONANT-TYPE CONVERTER

(75) Inventor: Masayasu Tomiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 10/782,996

(22) Filed: Feb. 23, 2004

(65) Prior Publication Data
US 2004/0170031 A1 Sep. 2, 2004

(30) Foreign Application Priority Data
Feb. 27, 2003 (JP) .............................. 2003-051923

(51) Int. Cl.
H02H 3/20 (2006.01)
(52) U.S. Cl. .................................................. 361/91.1
(58) Field of Classification Search ............... 361/91.1, 361/18; 363/21.02, 56.11, 21.03
See application file for complete search history.

(56) References Cited

U.S. PATENT DOCUMENTS

| | | | | |
|---|---|---|---|---|
| 4,757,433 A | * | 7/1988 | Santelmann, Jr. ............ | 363/19 |
| 6,094,362 A | * | 7/2000 | Domingo .................... | 363/56.1 |

* cited by examiner

Primary Examiner—Shawn Riley
(74) Attorney, Agent, or Firm—Fitzpatrick, Cella, Harper & Scinto.

(57) ABSTRACT

A power supply system is implemented without adding a filter circuit by configuring an overvoltage protection circuit without a thyristor. A sub-loop control circuit is added to an AC/DC converter. The sub-loop control circuit is configured such that a photoreceptor side transistor of a photocoupler 26 has the collector terminal connected to the gate terminal of a MOS-FET 2 via a resistor 38, and the emitter terminal connected to the base terminal of a transistor 3, and that the phototransmitter side of the photocoupler 26 is connected to an operational amplifier 39, resistors 40–43, and a Zener diode 44. In addition, in a DC—DC converter, a Zener diode 45 is connected across the input of the converter and the non-inverting input terminal of a comparator 33 with the anode of the Zener diode being connected to the non-inverting input terminal.

3 Claims, 7 Drawing Sheets

OVERVOLTAGE FLY-BACK RESONANT-TYPE CONVERTER

This application claims priority from Japanese Patent Application No. 2003-051923 filed Feb. 27, 2003, which is incorporated hereinto by reference.

BACKGROUND OF THE INVENTION

1. Field of the Invention

The present invention relates to a power supply system, and more particularly to a power supply including a self-excited flyback converter.

2. Description of the Related Art (Basic Operation of Switching Power Supply Unit)

A power supply system using a commercial power supply usually includes an AC/DC converter for obtaining a DC output. As such an AC/DC converter, a self-excited flyback converter (or called a ringing choke converter (RCC)) has been widely used conventionally.

FIG. 5 is a circuit diagram showing a basic configuration of a conventional self-excited flyback converter. An isolating transformer 1 has a primary winding Np at the input side, a secondary winding Ns at the output side, and an auxiliary winding Nb at the primary side. The auxiliary winding Nb is a drive winding of a transistor 3 for controlling the gate voltage of a MOS-FET 2, a switching device. The input voltage E is a DC voltage obtained by rectifying an AC input voltage by a set of bridge diodes and by smoothing through an aluminum electrolytic capacitor. The input voltage E appears across the aluminum electrolytic capacitor. The bridge diodes and the aluminum electrolytic capacitor are not shown.

The input voltage E is applied across a terminal of the winding Np connected to the drain terminal of the MOS-FET 2 via a terminal of the primary winding Np, having its (+) side connected to the start of the winding Np and its (−) side connected to the source terminal of the MOS-FET 2. The auxiliary winding Nb is placed in the same polarity with the primary winding Np, and the secondary winding Ns is placed in the opposite polarity. The MOS-FET 2 has its gate terminal connected to starting resistors 4 and 5. In addition, a capacitor 6 and gate resistors 7 and 8 are connected across the gate terminal of the MOS-FET 2 and the start of the auxiliary winding Nb. A diode 9 is connected in parallel with the gate resistor 8 with its cathode facing to the auxiliary winding Nb side to control the turn-on and turn-off speed of the MOS-FET 2.

A capacitor 10 is connected across the base of the transistor 3 and the (−) side of the input voltage. A resistor 11 is connected across the auxiliary winding Nb and the base of the transistor 3, and constitutes a time constant circuit with the capacitor 10.

A photocoupler 12 has its collector connected to the gate of the MOS-FET 2 via a resistor 13 for limiting the current flowing through the photocoupler 12, and has its emitter connected to the base of the transistor 3. The isolating transformer 1 has the end of the secondary winding Ns connected to the anode of a rectifying diode 14. An electrolytic capacitor 15 is connected across the cathode of the diode 14 and the start of the secondary winding Ns.

The output voltage Vo is divided by resistors 16 and 17, and the divided voltage is applied to the inverting input terminal of an operational amplifier 18. A reference voltage generated by a Zener diode 19 and a resistor 20 is supplied to the non-inverting input terminal of the operational amplifier 18. Thus, the operational amplifier 18 compares the voltage applied to the inverting input terminal with the input reference voltage, and adjusts its output voltage, thereby controlling the current flowing through the diode in the photocoupler 12 via a resistor 21. A resistor 22 and a capacitor 23 connected across the inverting input terminal and output terminal of the operational amplifier 18 are provided for adjusting the gain and phase of the closed loop.

First, the input voltage E brings the MOS-FET 2 into conduction because the starting resistors 4 and 5 apply a bias to its gate terminal. Thus, the input voltage E is applied to the primary winding Np, and induces a voltage across the auxiliary winding Nb with the (+) of the voltage being at the start side of the winding. Although a voltage is induced across the secondary winding Ns, the voltage is not transferred to the secondary side because the voltage has its (−) at the anode side of the rectifier diode 14. Accordingly, the current flowing through the primary winding Np is only the exciting current of the isolating transformer 1, and the isolating transformer 1 stores the energy proportional to the square of the exciting current which increases in proportion to time. The voltage induced across the auxiliary winding Nb charges the gate of the MOS-FET 2 via the capacitor 6 and resistors 7 and 8, thereby continuing the conduction state of the MOS-FET 2.

The capacitor 10, which constitutes the time constant circuit with the resistor 11, is charged by the current from the auxiliary winding Nb. When the voltage across the capacitor 10 exceeds Vbe of the transistor 3, the transistor 3 conducts, which reduces the gate voltage of the MOS-FET 2 and brings the MOS-FET 2 out of conduction. Thus, voltages opposing to the voltages at the start are induced across the individual windings of the isolating transformer so that the secondary winding generates the voltage having its (+) at the anode side of the rectifier diode 14. As a result, the energy stored in the isolating transformer 1 is rectified and smoothed, and transferred to the secondary side. When the energy stored in the isolating transformer 1 is completely transferred to the secondary side, the MOS-FET 2 conducts again.

The reason for this is as follows. The voltage proportional to the drain-source voltage of the MOS-FET 2 is induced across the auxiliary winding Nb. On the other hand, immediately after the MOS-FET 2 is brought out of conduction, the gate terminal is biased at (−), and the (−) bias gradually reduces when the transfer of the energy to the secondary side is completed. Thus, the gate terminal of the MOS-FET 2 is biased toward the (+) direction again through the coupling capacitor 6.

The photocoupler 12 increases its current with an increase of the output voltage Vo, and supplies an increasing current to the capacitor 10, thereby reducing the charge time. This reduces the conduction duration of the MOS-FET 2 and the energy stored in the isolating transformer 1, thereby carrying out the constant voltage operation by decreasing the output voltage Vo. When the output voltage is low, the operation is carried out in the opposite direction.

FIG. 6 is a diagram illustrating current or voltage waveforms at various portions of the self-excited flyback converter. In FIG. 6, $V_G$ designates the gate voltage of the MOS-FET 2, $V_{DS}$ designates the drain-source voltage of the MOS-FET 2, $I_D$ designates the drain current, $V_{Ns}$ designates the voltage induced across the secondary winding Ns, $I_S$ designates the current flowing through the rectifier diode 14 at the secondary side, and $V_{Nb}$ designates the voltage induced across the auxiliary winding $N_b$.

First, the ON period of the MOS-FET 2 will be described. When the gate bias is applied via the starting resistors 4 and 5, it increases the potential of $V_G$, and brings the MOS-FET 2 into conduction. Accordingly, the current $I_D$ increases linearly with time, and stores energy in the isolating transformer 1. In this case, since the MOS-FET 2 is in the conduction state, $V_{DS}$ maintains its potential at nearly zero. On the other hand, although the rectifier diode 14 at the secondary side is supplied with $V_{Ns}$, since it provides the reverse bias, $I_S$ is kept zero. The auxiliary winding Nb has the voltage indicated by $V_{Nb}$ in this case.

When the capacitor 10 is charged, the transistor 3 conducts and the gate voltage $V_G$ of the MOS-FET 2 becomes zero, thereby bringing the MOS-FET 2 out of conduction. Accordingly, $I_D$ becomes zero, and $V_{DS}$ equals the sum of the output voltage of the secondary side multiplied by the turn ratio for the input voltage E plus the surge voltage. In this case, the rectifier diode 14 at the secondary side conducts, and the energy stored in the isolating transformer 1 is transferred to the secondary side. The current $I_S$ linearly reduces with the negative slope, so that the auxiliary winding generates a negative voltage.

(Operation of DC/DC Converter)

A DC—DC converter is usually used in the power supply system to convert the output voltage from the switching power supply to a desired voltage level. In the conventional power supply system, a step-down DC—DC converter has been widely used as such a DC—DC converter.

FIG. 7 is a circuit diagram showing a basic configuration of the step-down DC—DC converter. The step-down DC—DC converter is placed in the post-stage of the switching power supply unit to generate any specified DC output voltage (V1) from the DC output voltage (Vo) of the switching power supply unit. The step-down DC—DC converter mainly comprises an input capacitor 28, a p-channel MOS-FET 29, an inductor 30, a diode 31, and a rectifier capacitor 32. The p-channel MOS-FET 29 has its source connected to the Vo side, and the drain connected to a first terminal of the inductor 30. The rectifier capacitor 32 is connected across the second terminal of the inductor 30 and the ground GND. On the MOS-FET 29 side of the inductor 30 is connected the cathode of the diode 31 whose anode is connected to GND. A comparator 33 has its output terminal connected to the gate of the MOS-FET 29 via a resistor 34. The non-inverting input terminal of the comparator 33 is supplied with the output voltage (V1) via a resistor 35 as a detection voltage, and the inverting input terminal is supplied with a voltage obtained by dividing the input voltage (Vo) by resistors 36 and 37. When the output voltage supplied to the non-inverting input terminal is lower than the reference voltage supplied to the inverting input terminal, the output of the comparator 33 becomes Low level. Thus, the p-channel MOS-FET 29 conducts, and the capacitor 32 is charged through the inductor 30. When the non-inverting input terminal voltage exceeds the inverting input terminal voltage because of the charge of the capacitor 32, the output of the comparator 33 becomes High level. Thus, the p-channel MOS-FET 29 is brought out of conduction, and the diode 31 conducts, thereby terminating the regenerative cycle of the inductor 30. Repeating the foregoing operation, the DC/DC converter supplies the specified DC output voltage to an apparatus such as a micro-controller.

(Operation of Overvoltage Protection Circuit)

Next, the operation of an overvoltage protection circuit for preventing the overvoltage at the time of an open loop, device destruction or the like in the conventional switching power supply unit will be described with reference to FIG. 5. The Zener diode 25 has its cathode connected to the output side terminal via the resistor 24, and its anode terminal connected to the anode terminal of the phototransmitter side of the photocoupler 26 for transferring a signal. The cathode terminal of the phototransmitter side is connected to the GND terminal.

The MOS-FET 2 has its gate terminal connected to the anode terminal of a thyristor 27 for the latch operation, and its source terminal connected to the cathode terminal of the thyristor 27. The photoreceptor side transistor of the photocoupler 26 has its collector connected to the gate terminal of the MOS-FET 2, and its emitter connected to the gate terminal of the thyristor 27.

If the feedback signal is lost because of the short-circuit between the input terminals of the operational amplifier 18 or because of the device open of the photocoupler 12, for example, the normal closed-loop control becomes impossible, thereby increasing the output voltage. This will bring about a failure in the output side circuit, or action of the explosion-proof valve of the aluminum electrolytic capacitor.

To curb the abnormal increase in the output voltage, the conventional apparatus carries out the protective operation with the circuit including the Zener diode 25, photocoupler 26, thyristor 27 and the like. The operation will now be described.

If the output voltage exceeds the operation voltage of the Zener diode 25 because of an abnormal operation of the closed-loop control, a current flows through the phototransmitter side of the photocoupler 26 via the resistor 24. The current is transmitted to the photoreceptor side of the photocoupler 25, and supplies the gate terminal of the thyristor 27 with a trigger current. Thus, a current flows through the thyristor 27 from its anode to cathode, thereby reducing the gate voltage of the MOS-FET 2. The reduction in the gate voltage halts the oscillation of the MOS-FET 2, thereby reducing the output voltage.

Since the thyristor 27 is supplied with the hold current from the starting resistor 4 side, the MOS-FET 2 continues to halt the oscillation until the AC input is turned off and the hold current is removed. As a result, the output voltage (Vo) is reduced, and the post-stage DC—DC converter stops its operation, reducing the DC output voltage (V1) of the DC—DC converter.

The conventional circuit configuration, however, has a problem of increasing the cost of the components because of the expensive thyristor used for preventing the overvoltage.

In addition, it has a problem of requiring an additional filter circuit to prevent the misoperation of the thyristor due to injection noise.

SUMMARY OF THE INVENTION

The present invention is implemented to solve the foregoing problem. It is therefore an object of the present invention to provide a low-cost power supply system and to circumvent the additional filter circuit by constructing the overvoltage protection circuit without using the thyristor.

To accomplish the objects, according to a first aspect of the present invention, there is provided an AC/DC converter comprising: a switching device for switching supply of a DC voltage to a primary side of a transformer, the DC voltage being obtained by rectifying and smoothing an AC voltage fed from a commercial power supply; a rectifier circuit for rectifying a secondary side output of the transformer; a first control circuit for controlling the switching device such that a constant output voltage is produced from an output terminal; and a second control circuit for controlling the switching device such that the voltage of the output terminal becomes a predetermined voltage higher than the constant output voltage.

According to a second aspect of the present invention, there is provided a power supply system comprising: an AC/DC converter controlled such that a constant output voltage is produced from an output terminal, and that when the constant output voltage cannot be output from the output terminal, a predetermined voltage higher than the constant output voltage is output; and a DC—DC converter including a converter for converting the predetermined voltage output from the AC/DC converter, and a protective circuit for halting the converting operation if the AC/DC converter produces the predetermined voltage.

The power supply system may further comprise a reset circuit for supervising the output of the DC—DC converter voltage, and for outputting a reset signal when the DC—DC converter halts the converting operation.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The embodiments in accordance with the present invention will now be described with reference to the accompanying drawings.

Figure 1:
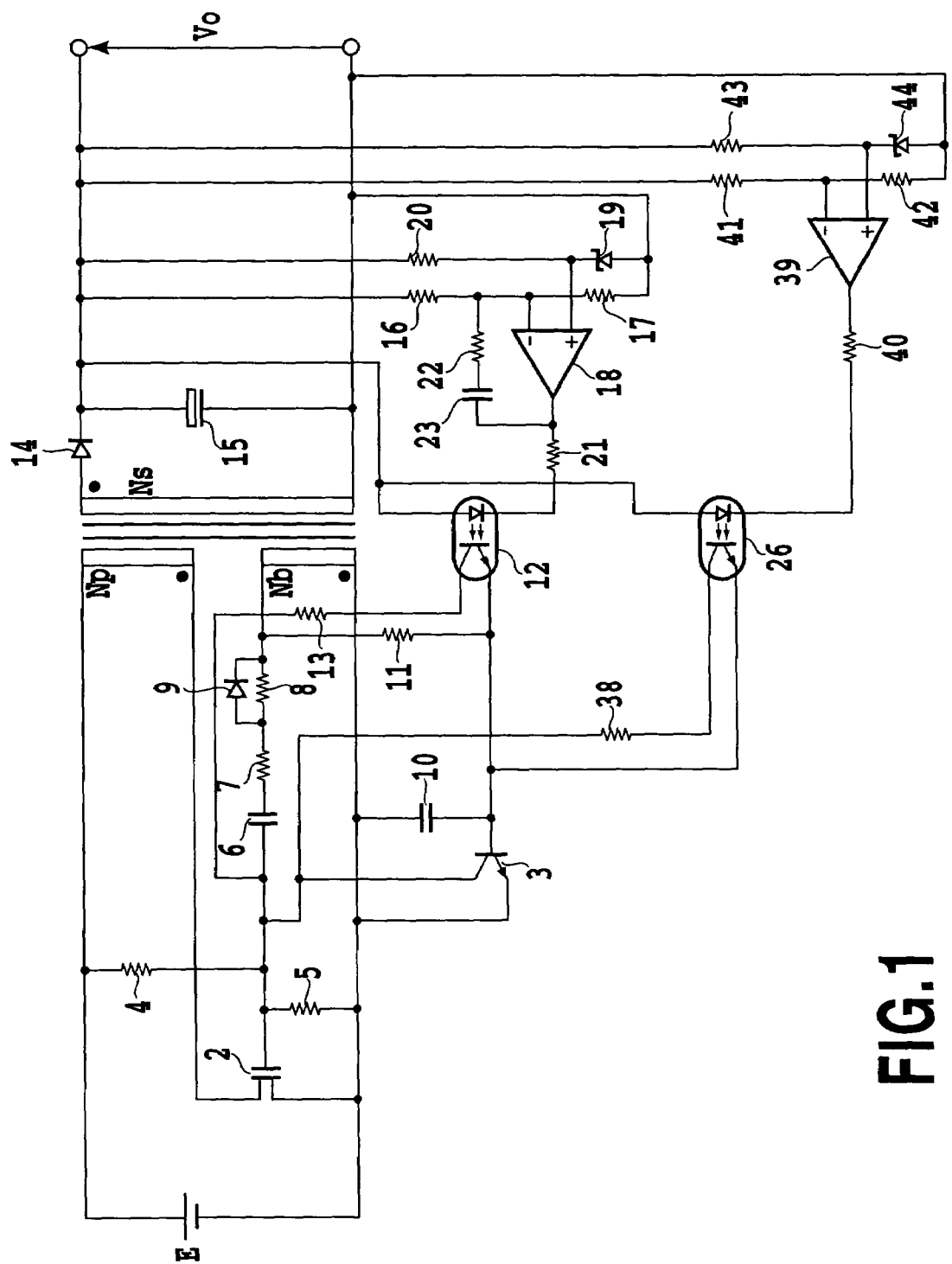
FIG. 1 is a circuit diagram showing a basic configuration of an AC/DC converter of an embodiment in accordance with the present invention.
Figure 2:
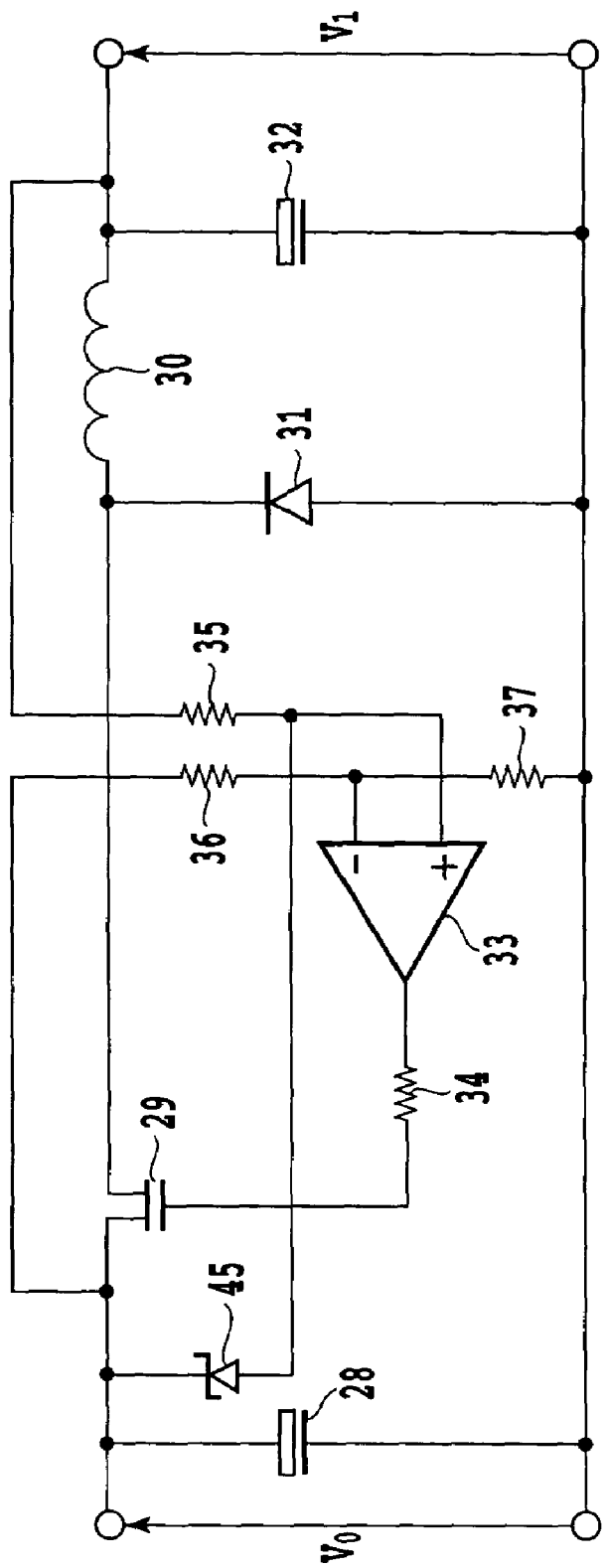
FIG. 2 is a circuit diagram showing a basic configuration of a DC/DC converter of the embodiment in accordance with the present invention.
Figure 5:
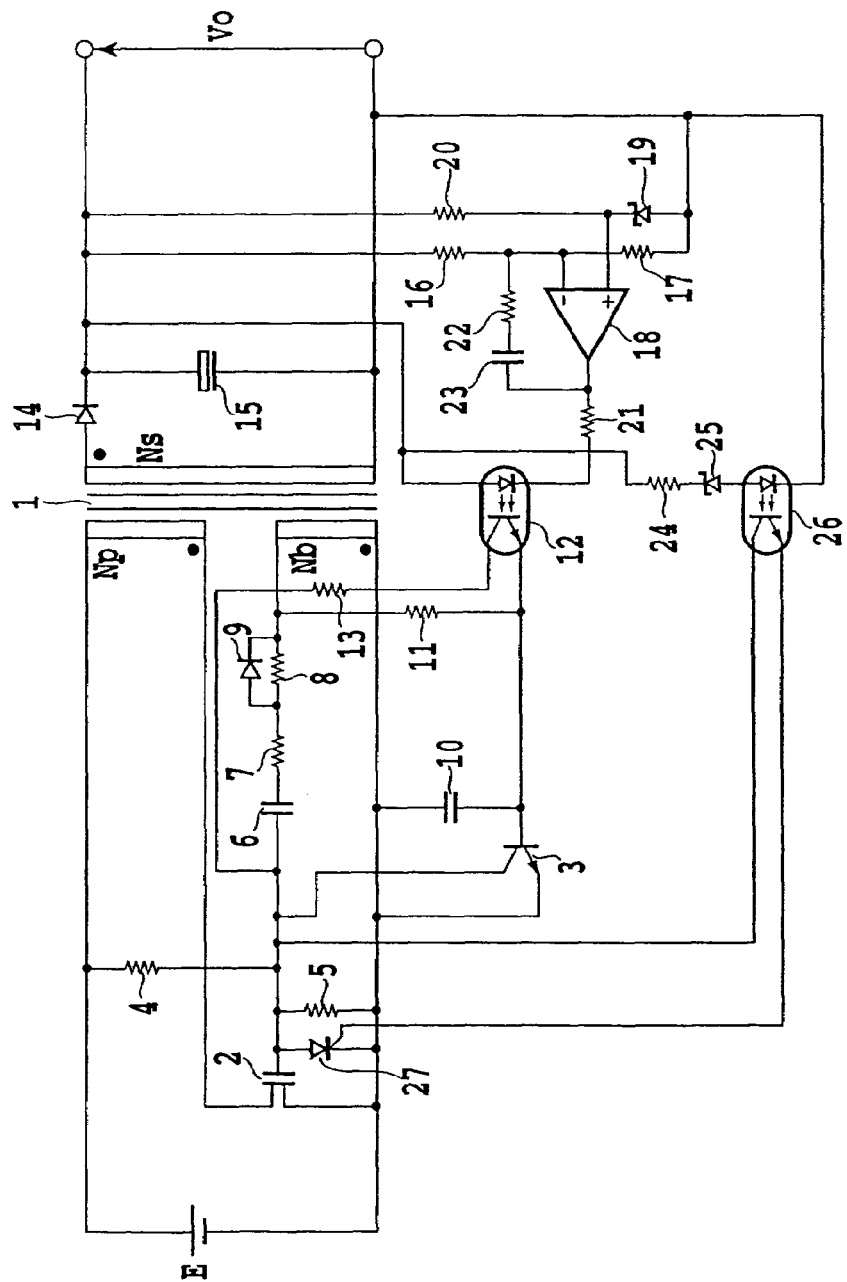
FIG. 5 is a circuit diagram showing a basic configuration of a conventional self-excited flyback converter.
Figure 6:
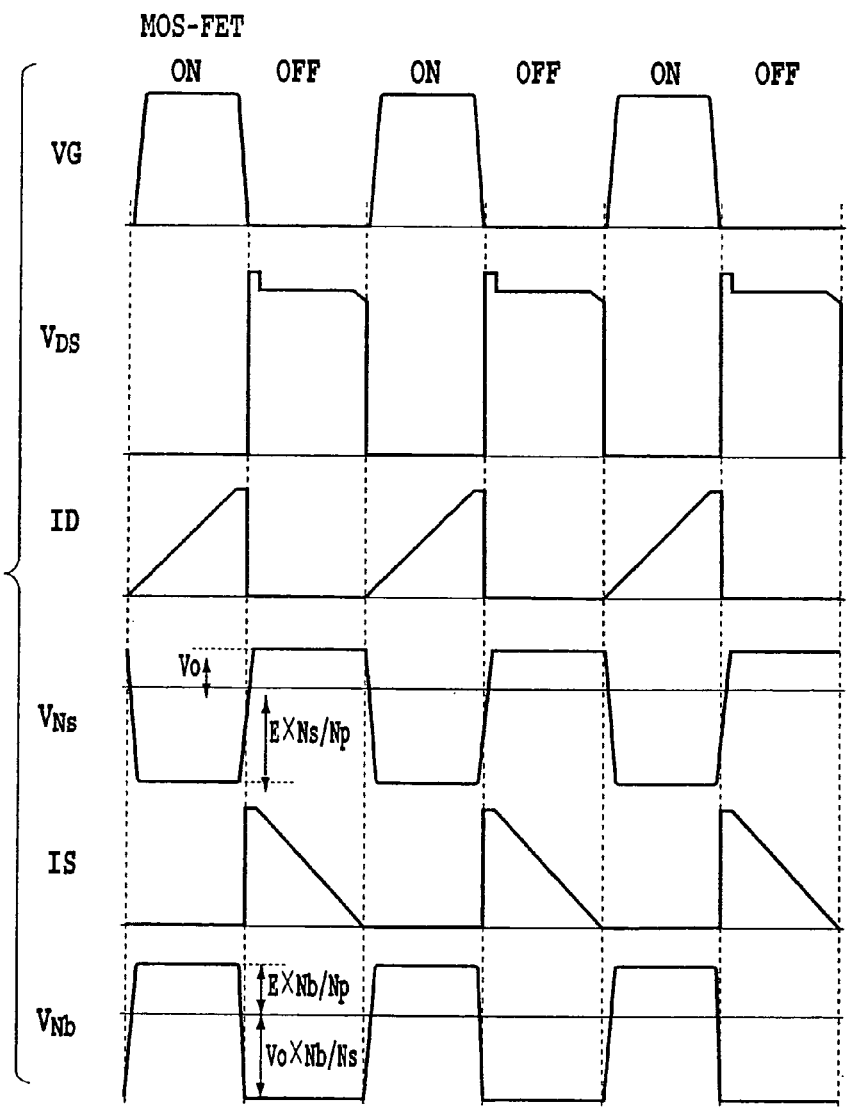
FIG. 6 is a waveform diagram illustrating the currents or voltages in various portions of the RCC circuit.
Figure 7:
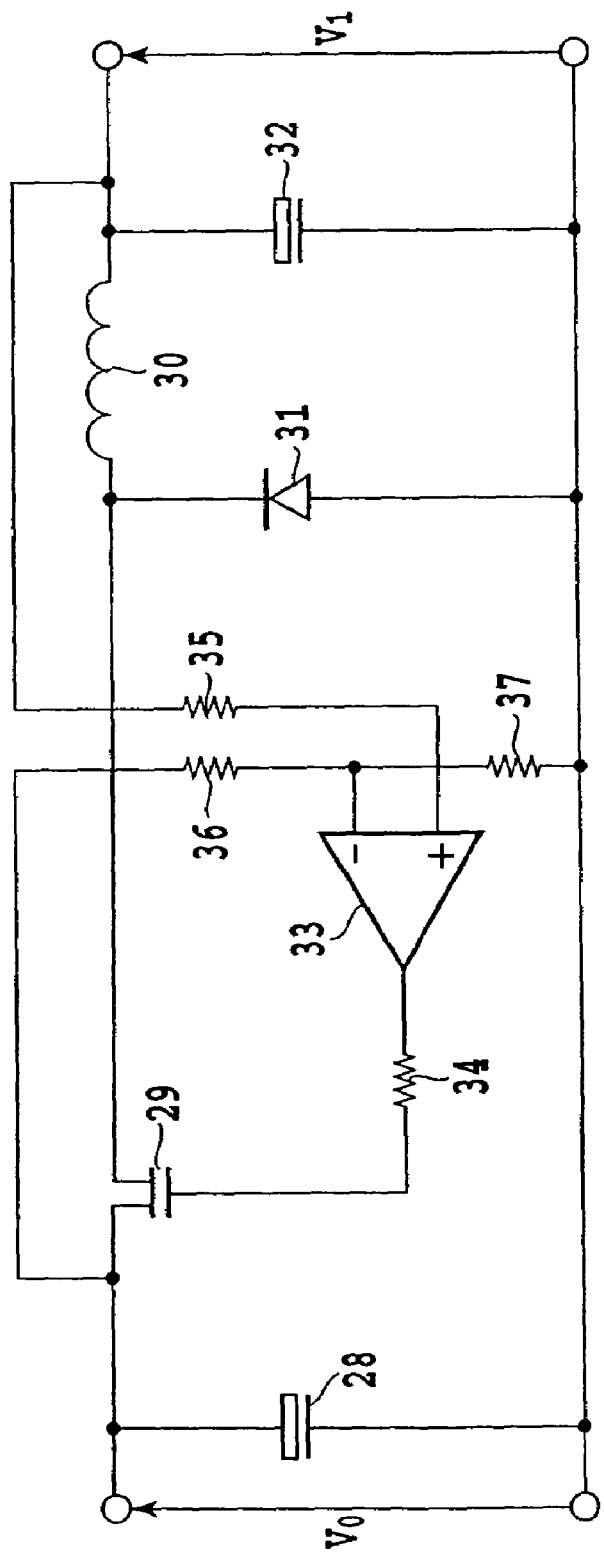
FIG. 7 is a circuit diagram showing a basic configuration of a DC—DC converter.

FIG. 1 is a circuit diagram showing a basic configuration of an AC/DC converter of an embodiment in accordance with the present invention; and FIG. 2 is a circuit diagram showing a basic configuration of a DC/DC converter of the embodiment in accordance with the present invention. In these figures, the components having the same functions as those of the conventional technique as shown in FIGS. 5 and 7 are designated by the same reference numerals, and the description of their operation is omitted here.

The apparatus of FIG. 1 differs from the conventional technique in that it includes, instead of the thyristor 27, a sub-loop control circuit for controlling the switching device such that the voltage at the output terminal becomes a predetermined voltage when it exceeds a constant voltage. The sub-loop control circuit is configured such that the photoreceptor side transistor of the photocoupler 26 has its collector terminal connected to the gate terminal of the MOS-FET 2 via a resistor 38, and its emitter terminal connected to the base terminal of the transistor 3, and that the phototransmitter side of the photocoupler 26 is connected to an operational amplifier 39, resistors 40–43, and a Zener diode 44. Furthermore, as shown in FIG. 2, the DC—DC converter in accordance with the present invention includes, in addition to the components of the conventional DC—DC converter, the overvoltage protective function, and a Zener diode 45 connected across the input of the converter and the non-inverting input terminal of the comparator 33 having its anode connected to the non-inverting input terminal in order to increase the durability to the overvoltage. The operation of the present embodiment will be described below.

(Sub-Loop Control)

In the sub-loop control circuit of the switching power supply as shown in FIG. 1, the operational amplifier 39 has its inverting input terminal connected to the detection voltage divided by the resistors 41 and 42, and its non-inverting input terminal supplied with the reference voltage generated by the Zener diode 44 and the resistor 43. Here, assume that the voltage value of the output voltage Vo is Vacdc1 which is output from the output terminal during the main-loop control for converting the input DC voltage to the constant output voltage by controlling the switching device, and that the voltage value of the output voltage Vo during the sub-loop control is Vacdc2. In this case, the inequality Vacdc2>Vacdc1 holds, which means that when the DC output voltage Vo exceeds the Vacdc1, the sub-loop control circuit begins to control the AC/DC converter.

When the sub-loop control circuit takes over the control, the operational amplifier 39 compares the input voltage to the inverting input terminal with the reference voltage, and controls the current flowing through the diode of photocoupler 26 via the resistor 40 by adjusting the voltage of the output terminal. The method of carrying out the constant voltage control by varying the current flowing through the photoreceptor of the photocoupler 26 is the same as that of the photocoupler 12 described in the conventional technique. Thus, the AC/DC converter maintains its operation by the sub-loop control until the DC output voltage exceeds Vacdc1 and reaches Vacdc2.

(Overvoltage Protective Function)

Next, the operation of the DC—DC converter as shown in FIG. 2 at an increase in the input voltage will be described. The Zener diode 45 is connected across the source terminal of the MOS-FET 29 and the non-inverting input terminal of the comparator 33. Thus, if the input voltage to the DC—DC converter increases and exceeds the voltage equal to the non-inverting input terminal voltage plus the operation voltage (Vz) of the Zener diode 45, that is, the protective voltage of the DC—DC converter, the Zener diode 45 conducts, and the non-inverting input terminal voltage of the comparator 33 becomes higher than the inverting input terminal voltage. As a result, the oscillation of the MOS-FET 29 stops and the DC output voltage is reduced. The reduction in the output continues as long as the Zener diode 45 keeps the conduction state.

To reduce the output by the foregoing operation, it is necessary for the sum voltage (Vz+V1) of the Zener voltage (Vz) across the Zener diode 45 and the output voltage (V1) of the DC—DC converter to be lower than the output voltage (Vacdc2) during the sub-loop control. In addition, to prevent the reduction in the output of the DC—DC converter during the main-loop control, the following relationship is required.

$$Vacdc1 < Vz+V1 < Vacdc2$$

Therefore the combination of the foregoing sub-loop control and the overvoltage protective function can reduce the output of the DC—DC converter positively, and secure the function of the switching power supply as the conventional one without using the thyristor.

Figure 3:
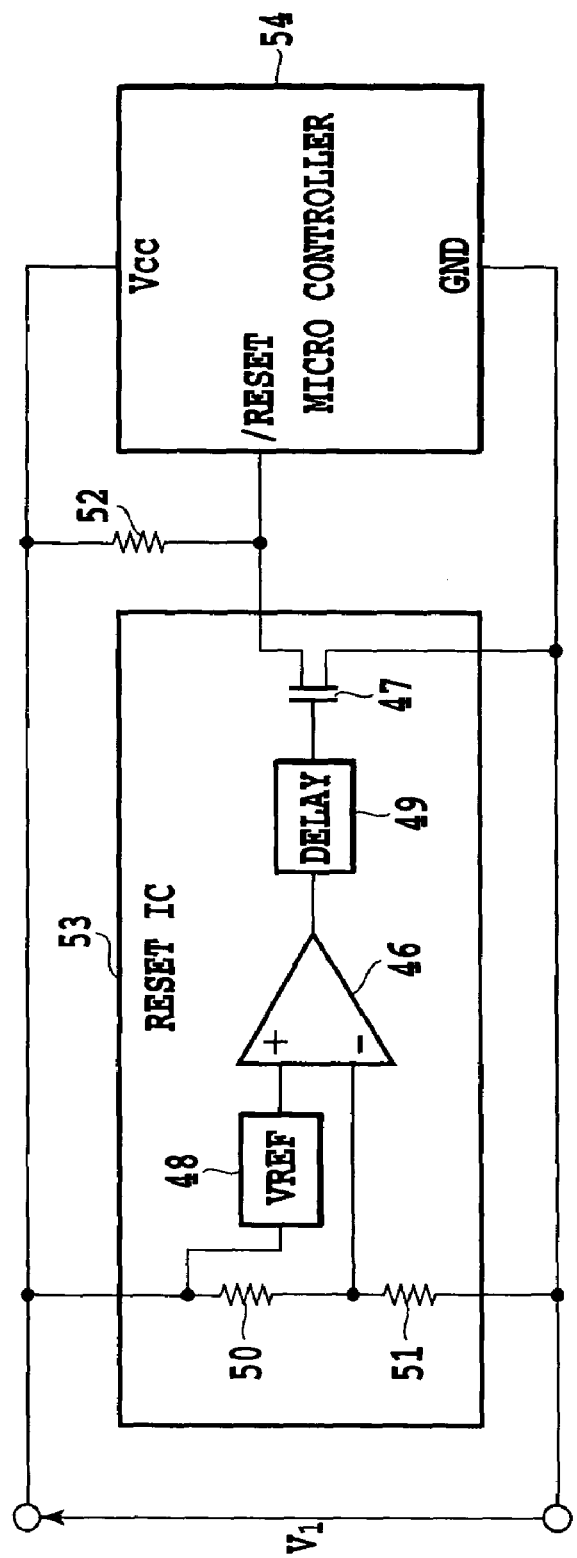
FIG. 3 is a block diagram showing a micro-controller and reset IC operated by the DC output voltage of the DC—DC converter.

FIG. 3 is a block diagram showing a micro-controller 54 as an apparatus operating at the DC output voltage of the DC—DC converter of FIG. 2, and a reset IC 53 incorporating a reset circuit for supervising the DC output voltage. The reset IC 53 comprises an operational amplifier 46, a MOS-FET 47, a reference voltage generating circuit 48, and a delay circuit 49. The operational amplifier 46 has its inverting input terminal connected to the voltage obtained by dividing the detection voltage by the resistors 50 and 51, and compares it with the reference voltage at the non-inverting input terminal supplied from the reference voltage generating circuit 48. Thus, the operational amplifier 46 varies its output.

The operational amplifier 46 has its output connected to the delay circuit 49 to prevent the MOS-FET 47 from varying its output immediately in response to the detection voltage. The reset IC 53 has the open drain output employing the drain of the MOS-FET 47 as the output terminal. A pull-up resistor 52 is connected across the output of the reset IC 53 and the /Reset input of the micro-controller 54. For example, since the inverting input terminal voltage is lower than the non-inverting input terminal voltage at turn-on, the output of the operational amplifier 46 is place at the High level. Accordingly, the MOS-FET 47 is brought into conduction, and the output of the reset IC becomes Low, thereby holding the reset state of the micro-controller 54.

When the inverting input terminal voltage exceeds the non-inverting input terminal voltage because of an increase in the power supply voltage, the output of the operational amplifier 46 becomes Low. Thus, the MOS-FET 47 is brought out of conduction, the output of the reset IC 53 is placed at the High level, and the reset state of the micro-controller 54 is released. The operation of the reset IC 53 enables the hold and release of the reset state of the micro-controller 54 independently of the rising characteristics of the power supply voltage.

Figure 4:
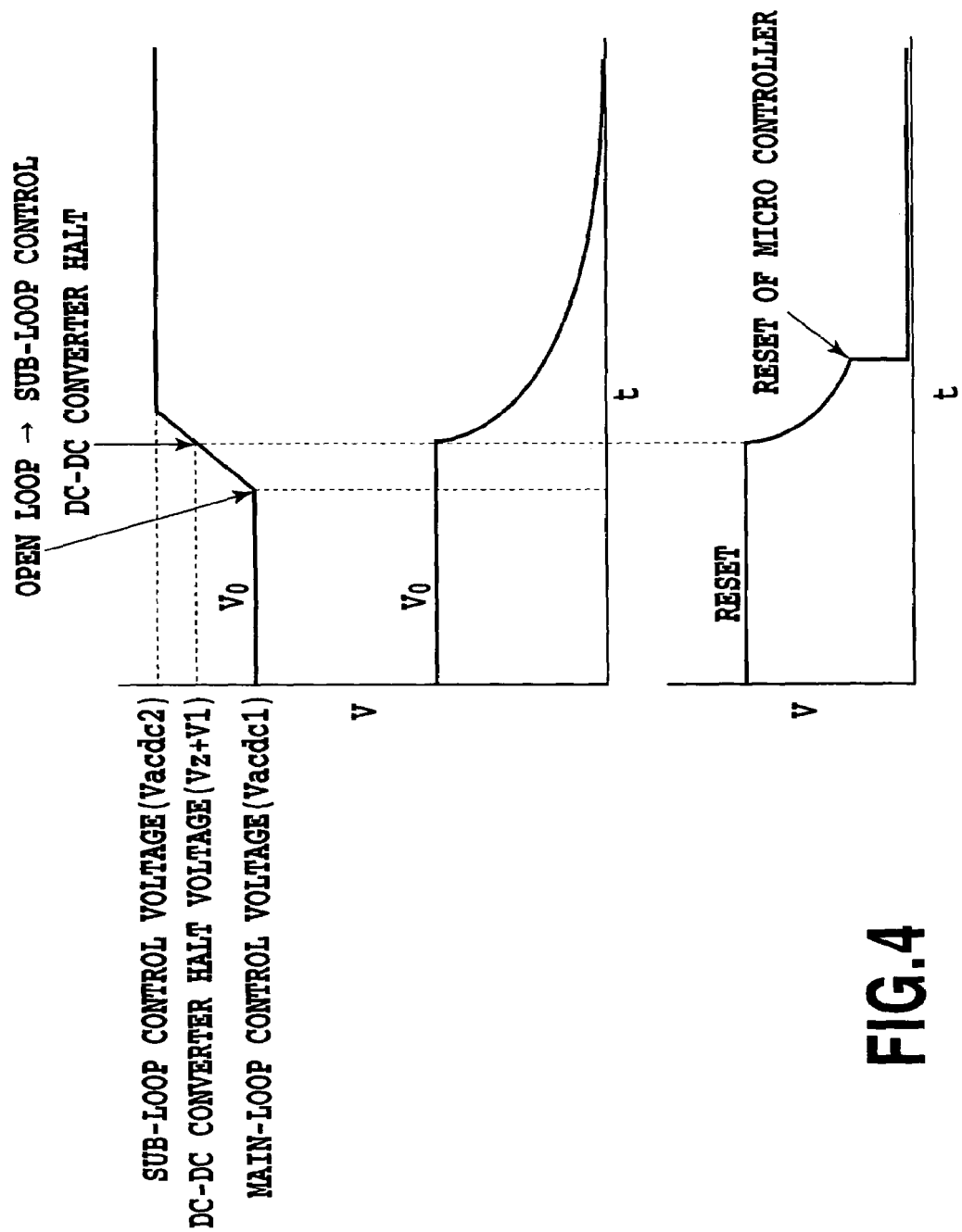
FIG. 4 is a waveform diagram illustrating the operation from an increase in the output voltage because of an abnormal condition of the AC/DC converter to the reset of the micro-controller.

FIG. 4 is a waveform diagram illustrating the operation from an increase in the output voltage due to the abnormal condition (such as an open-loop operation) of the AC/DC converter to the reset of the micro-controller 54.

First, when the main-loop control by the first control circuit is halted because of the open loop, the sub-loop control is activated so that the output voltage (Vo) of the switching power supply starts to increase from Vacdc1. When the output voltage (Vo) of the switching power supply reaches Vz+V1, the DC—DC converter halts its operation, and the output voltage (V1) starts to decrease. When the output (V1) reduces to the reset voltage, the reset IC 53 operates and places the /Reset signal of the micro-controller 54 at Low. When the micro-controller 54 enters the reset state, the apparatus operated by the instant power supply system cannot operate, and notifies a user that it cannot operate.

It can also prevent the destruction or the like by determining Vacdc2 at a value equal to or lower than the withstand voltage of the apparatus even in the voltage abnormal condition such as the open loop because the output of the switching power supply is controlled with reference to Vacdc2.

As described above, according to the present invention, the AC/DC converter includes the control circuit for controlling the switching device such that the voltage at the output terminal becomes the predetermined voltage, and the predetermined voltage is higher than the constant DC output. As a result, the present invention can configure the overvoltage protection circuit without using the thyristor, and hence can provide a low-cost power supply system without adding the filter circuit.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An AC/DC converter comprising:
   a switching device for switching supply of a DC voltage to a primary side of a transformer, said DC voltage being obtained by rectifying and smoothing an AC voltage fed from a commercial power supply;
   a rectifier circuit for rectifying a secondary side output of said transformer;
   a first control circuit for controlling said switching device based on a detected voltage of an output terminal such that the voltage of the output terminal becomes a constant output; and
   a second control circuit for controlling said switching device based on the detected voltage of the output terminal such that the voltage of the output terminal becomes a predetermined voltage higher than the constant output voltage, when said first control circuit fails to control the voltage of the output terminal to become the constant output voltage.

2. A power supply system comprising:
   an AC/DC converter controlled based on a detected voltage of a output terminal, such that the voltage of the output terminal becomes a constant output voltage and, when the constant output voltage cannot be output from said output terminal, the voltage of the output terminal becomes a predetermined voltage higher than the constant output voltage; and
   a DC—DC converter including a converter for converting the output voltage from said AC/DC converter, and a protective circuit for halting the converting operation if said AC/DC converter produces the predetermined voltage.

3. The power supply systems claimed in claim 2, further comprising a reset circuit for supervising the output of the DC—DC converter voltage, and for outputting a reset signal when said DC—DC converter halts the converting operation.

* * * * *

UNITED STATES PATENT AND TRADEMARK OFFICE
CERTIFICATE OF CORRECTION

PATENT NO. : 7,023,679 B2
APPLICATION NO. : 10/782996
DATED : April 4, 2006
INVENTOR(S) : Masayasu Tomiyama It is certified that error appears in the above-identified patent and that said Letters Patent is hereby corrected as shown below:

COLUMN 1:
Line 18, "As" should read -- In --; and
Line 46, "to" should be deleted.

COLUMN 7:
Line 32, "place" should read -- placed --.

COLUMN 8:
Line 45, "a output" should read -- an output --.

Signed and Sealed this

Thirtieth Day of January, 2007

JON W. DUDAS
*Director of the United States Patent and Trademark Office*